US012597689B2

(12) United States Patent
Sterling et al.

(10) Patent No.: US 12,597,689 B2
(45) Date of Patent: Apr. 7, 2026

(54) SUPERCONDUCTING MICROWAVE FILTERS

(71) Applicant: Google LLC, Mountain View, CA (US)

(72) Inventors: George Earl Grant Sterling, Santa Barbara, CA (US); Michael C. Hamilton, Auburn, AL (US); Lev Ioffe, Santa Barbara, CA (US); Charles Neill, Goleta, CA (US)

(73) Assignee: Google LLC, Mountain View, CA (US)

(*) Notice: Subject to any disclaimer, the term of this patent is extended or adjusted under 35 U.S.C. 154(b) by 313 days.

(21) Appl. No.: 18/202,870

(22) Filed: May 26, 2023

(65) Prior Publication Data

US 2024/0396194 A1 Nov. 28, 2024

(51) Int. Cl.
*H01P 1/20* (2006.01)

(52) U.S. Cl.
CPC .................................... *H01P 1/20* (2013.01)

(58) Field of Classification Search
CPC .......... H01P 1/20; H01P 1/2039; H01P 3/081; H01P 3/085
See application file for complete search history.

(56) References Cited

U.S. PATENT DOCUMENTS

| | | | |
|---|---|---|---|
| 2020/0083584 A1 | 3/2020 | Olivadese et al. | |
| 2022/0005998 A1* | 1/2022 | Lagally | H01P 3/003 |
| 2023/0138353 A1* | 5/2023 | Zheng | H10N 60/0156 257/14 |

FOREIGN PATENT DOCUMENTS

| | | |
|---|---|---|
| CN | 1689189 | 10/2005 |
| EP | 3516596 | 5/2022 |

OTHER PUBLICATIONS

International Search Report and Written Opinion in International Appln. No. PCT/US2024/031102, mailed on Sep. 20, 2024, 23 pages.
Wang et al., "Electromagnetic properties of aluminum-based bilayers for kinetic inductance detectors." Submitted on Apr. 2023, arXiv:2304.00431v1, 6 pages.
Lolli et al., "Aluminum-Titanium Bilayer for Near-Infrared Transition Edge Sensors" Sensors 16.7, Jun. 23, 2016, 7 pages.
Wang et al., "Electromagnetic properties of aluminum-based bilayers for kinetic inductance detectors." Poster, Presented at the Applied Superconductivity Conference, Oct. 24, 2022, 1 page.

* cited by examiner

*Primary Examiner* — Andrea Lindgren Baltzell
*Assistant Examiner* — Kimberly E Glenn
(74) *Attorney, Agent, or Firm* — Fish & Richardson P.C.

(57) ABSTRACT

A microwave filter includes a multilayer stack. The multilayer stack includes one or more first-type layers composed of a first superconductor material having a first superconducting critical temperature; and one or more second-type layers composed of a non-superconductor metal or a second superconductor material having a second superconducting critical temperature that is lower than the first superconducting critical temperature. The multilayer stack is configured to behave as a dissipative metal for photons having a frequency above twice a superconducting gap frequency of the multilayer stack and to behave as a superconductor for photons having a frequency below twice the superconducting gap frequency of the multilayer stack.

29 Claims, 13 Drawing Sheets

SUPERCONDUCTING MICROWAVE FILTERS

FIELD OF THE DISCLOSURE

The present disclosure relates to filters, such as microwave filters.

BACKGROUND

High-energy photons (e.g., >20 GHz to THz) can deteriorate qubit performance. Accordingly, signals associated with quantum computation (e.g., qubit control or readout signals) can be filtered to remove high-energy photons.

SUMMARY

Some aspects of this disclosure relate to a microwave filter. The microwave filter includes a multilayer stack. The multilayer stack includes one or more first-type layers composed of a first superconductor material having a first superconducting critical temperature; and one or more second-type layers composed of a non-superconductor metal or a second superconductor material having a second superconducting critical temperature that is lower than the first superconducting critical temperature. The multilayer stack is configured to behave as a dissipative metal for photons having a frequency above twice a superconducting gap frequency of the multilayer stack and to behave as a superconductor for photons having a frequency below twice the superconducting gap frequency of the multilayer stack.

This and other microwave filters described herein can have one or more of at least the following characteristics.

In some implementations, the multilayer stack is configured to behave as a low-pass filter in which twice the superconducting gap frequency is a cutoff frequency.

In some implementations, a composition of the multilayer stack along a stack direction alternates between the one or more first-type layers and the one or more second-type layers.

In some implementations, the microwave filter is a microstrip line, a stripline, or a coplanar waveguide.

In some implementations, the multilayer stack is arranged in a shape such that the microwave filter behaves as a notch filter that attenuates photons having a frequency within a predefined frequency range.

In some implementations, the shape includes at least one of a spurline geometry or a stub geometry.

In some implementations, the predefined frequency range overlaps a frequency range of 8 GHz to 10 GHz.

In some implementations, the microwave filter is a cable.

In some implementations, the microwave filter includes a dielectric layer in which the multilayer stack is embedded.

In some implementations, the multilayer stack is a first multilayer stack, and the microwave filter includes a second multilayer stack on a first side of the dielectric layer, and a third multilayer stack on a second side of the dielectric layer. Each of the second and third multilayer stacks includes one or more first-type layers and one or more second-type layers.

In some implementations, the dielectric layer includes a polyimide.

In some implementations, the multilayer stack is a first multilayer stack, and the microwave filter includes a dielectric layer; and a second multilayer stack including one or more first-type layers and one or more second-type layers. The first multilayer stack is on a first side of the dielectric layer, and the second multilayer stack is on a second side of the dielectric layer.

In some implementations, the multilayer stack is a first multilayer stack, and the microwave filter includes: a substrate on which the first multilayer stack is disposed; a second multilayer stack disposed on the substrate, the second multilayer stack extending adjacent to a first side of the first multilayer stack; and a third multilayer stack disposed on the substrate, the third multilayer stack extending adjacent to a second side of the first multilayer stack. Each of the second and third multilayer stacks includes one or more first-type layers and one or more second-type layers.

In some implementations, the first, second, and third multilayer stacks are disposed on a first surface of the substrate, and the microwave filter includes: a fourth multilayer stack disposed on a second surface of the substrate opposite the first surface. The fourth multilayer stack includes one or more first-type layers and one or more second-type layers.

In some implementations, the microwave filter includes a printed circuit board. The multilayer stack is a trace on the printed circuit board.

In some implementations, the multilayer stack includes a third-type layer composed of a third superconductor material having a superconducting critical current density that is larger than a superconducting critical current density of the first superconductor material.

In some implementations, the one or first-type layers are arranged in a skin depth region of the microwave filter, and the third-type layer is arranged outside the skin depth region.

In some implementations, the multilayer stack includes, on each of two opposite sides of the third-type layer, a sub-stack including at least one of the one or more first-type layers and at least one of the one or more second-type layers.

In some implementations, a thickness of the third-type layer is greater than thicknesses of the one or more first-type layers.

In some implementations, a first first-type layer of the one or more first-type layers has a first footprint area that is orthogonal to a stack direction, and a first second-type layer of the one or more second-type layers has a second footprint area that is orthogonal to the stack direction. The first footprint area is different from the second footprint area.

In some implementations, a portion of the second footprint area protrudes beyond the first footprint area.

In some implementations, twice the superconducting gap frequency of the multilayer stack is between 8 GHz and 50 GHz.

In some implementations, a superconducting critical temperature of the multilayer stack is between 110 mK and 680 mK.

In some implementations, the multilayer stack is configured to exhibit, for signal components having a frequency above twice the superconducting gap frequency of the multilayer stack, a sheet resistance between 0.1 Ω/square and 10 Ω/square for at least some temperatures between 8 mK and 200 mK.

In some implementations, a superconductor critical current of the multilayer stack is between 0.1 mA and 25 mA.

In some implementations, the one or more first-type layers and the one or more second-type layers each have a thickness between 10 nm and 100 nm.

In some implementations, the microwave filter is coupled to a quantum computing device. The quantum computing device includes a quantum processor, a qubit readout resonator, or a qubit.

In some implementations, the microwave filter is configured to filter out the photons having the frequency above twice the superconducting gap frequency of the multilayer stack from a signal that couples to the quantum computing device.

In some implementations, the multilayer stack includes a dielectric layer between a first first-type layer of the one or more first-type layers and a first second-type layer of the one or more second-type layers.

Implementations described herein can be used to realize one or more potential advantages. In some implementations, filters can be provided with tunable cutoff frequencies and high levels of attenuation, resulting in effective filter operation. In some implementations, filters can be effectively thermalized and/or exhibit reduced scintillation compared to some alternative filter schemes. In some implementations, filters can be integrated on-chip, in packaging, and/or in cables, allowing for efficient spatial utilization and extensive filtering of on-chip signals. In some implementations, filters can have shapes that provided additional filtering effect(s), such a notch filtering, to remove undesired frequency component(s). In some implementations, operations of quantum computing devices that receive/couple to a signal transmitted through the filter can be improved, because high-frequency photons can be removed from the signal prior to signal reception/coupling.

The details of one or more implementations are set forth in the accompanying drawings and the description below. Other aspects, features and advantages will be apparent from the description and drawings, and from the claims.

DETAILED DESCRIPTION

Figure 1:
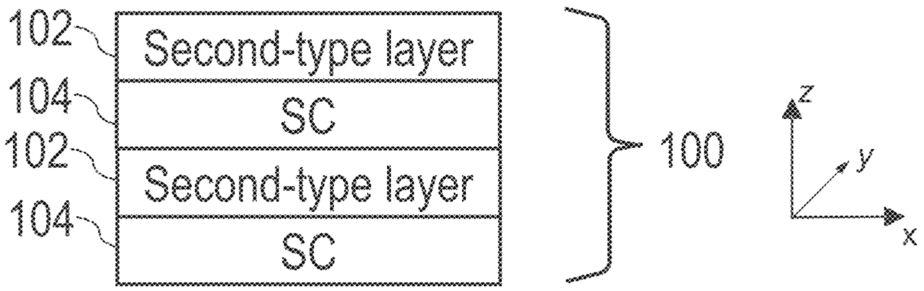
FIG. 1 is a cross-sectional diagram illustrating an example of a multilayer stack.

This disclosure relates to microwave filters configured to filter high-energy photons out of signals, such as control signals for quantum processors. Reflective filtering relying on steep out-of-band impedance mismatches (e.g., in lumped element or distributed configurations) may be insufficient to adequately filter high-energy photons, e.g., may provide too-low attenuation for out-of-band photons. Some approaches to photon filtering employ lossy conductive and/or magnetic powers suspended in dielectrics (e.g., epoxy or glycerol) to form an effective dielectric within the cavity of a waveguide or within the annular section of a coaxial cable. The particles are a lossy medium for high-energy photons. As a further example of filtering, cables formed of steel and teflon may behave as a low-pass filter.

However, powder-based and steel/teflon filters may be poorly thermalized, employing thick dielectrics between housing and active components. These thick dielectrics may be at elevated temperatures due to interactions with filtered-out high energy photons. In addition, some dielectrics, such as epoxy and teflon dielectrics, may exhibit scintillation due to background radiation and/or cosmic rays, further raising the temperature of the filter. High filter temperatures can lead to worse filter performance and/or may negatively affect quantum computing device operation (e.g., qubit operation). Moreover, powder-based and steel/teflon filters may not integrate well with high-density wiring schemes and may be incompatible with in-packaging and/or on-chip filtering.

Some implementations according to the present disclosure include filters (e.g., microwave filters) including a superconducting multilayer stack having multiple types of layers. The layers are configured to exhibit collective behavior that can attenuate some signals (absorb some photons) and transmit other signals with little or no attenuation on a frequency-selective basis. Specifically, when in a collective superconducting state, the layers exhibit a collective superconducting energy gap for Cooper pair formation. The superconducting energy gap is associated with a corresponding superconducting gap frequency for photons having energy equal to the superconducting energy gap. Signal components having a frequency at or above twice the superconducting gap frequency are attenuated when traveling through the multilayer stack (photons having a frequency above twice the superconducting gap frequency are more likely to be absorbed), because the multilayer stack behaves as a dissipative (non-superconducting) metal for signals/photons having those frequencies. Signal components having a frequency below twice the superconducting gap frequency are transmitted with little or no attenuation when traveling through the multilayer stack (photons having a frequency below twice the superconducting gap frequency are less likely to be absorbed), because the multilayer stack behaves as a superconductor for signals/photons having those frequencies. Based on this frequency-dependent behavior, the multilayer stack behaves as a low-pass filter with cutoff frequency equal to twice the stack's superconducting gap frequency.

Filters based on these multilayer stacks can be provided in various forms and contexts, e.g., in cabling, in packaging, and on-chip, offering design flexibility with which alternative filtering schemes (e.g., microwave filtering schemes) may be incompatible. As a result, filtering can be provided extensively throughout systems of interest (e.g., quantum computing systems) to drastically reduced the prominence of undesired signal components and, as a result, obtain improved system behavior. Moreover, compared to some alternative filtering schemes, the filters described herein can provide improved thermalization and/or exhibit reduced or eliminated scintillation.

For example, in some implementations the multilayer stack includes layers of at least two types. A first type of layer is a superconductor layer, e.g., is composed of a superconductor material. A second type of layer is (i) a non-superconductor metal layer or (ii) is a superconductor layer having a smaller superconducting gap (and, correspondingly, lower superconducting critical temperature)

than the first type of layer. For example, the second type of layer can be composed of a superconductor material having a smaller superconducting gap (and, correspondingly, lower superconducting critical temperature) than the superconductor material of the first type of layer.

Based on the composition, arrangement, and thickness(s) of the multiple layers of the multilayer stack, the multilayer stack, as a whole, exhibits a superconducting gap frequency when in superconducting conditions, such as when cooled to below the stack's superconducting critical temperature, not exposed to a magnetic field above the stack's superconducting critical magnetic field, etc. The multilayer stack is configured to behave as a dissipative (non-superconducting) metal for photons having a frequency above twice the superconducting gap frequency, and to behave as a superconductor (with little or no dissipation) for photons having a frequency below twice the superconducting gap frequency. Accordingly, the multilayer stack can be used in a filter, e.g., a low-pass microwave filter, attenuating photons/signal components above twice the superconducting gap frequency and transmitting photons/signal components below twice the superconducting gap frequency.

FIG. 1 illustrates an example of a multilayer stack 100 of a filter according to some implementations of the present disclosure. The multilayer stack 100, shown in a cross-sectional view, includes one or more first-type layers 104 and one or more second-type layers—in this example, two of each. As described above, each first-type layer 104 is a superconductor layer, and each second-type layer 102 is a non-superconductor metal layer or a superconductor layer having a lower superconducting critical temperature than the first-type layers 104. In this example, the non-superconductor metal layers 102 and the superconductor layers 104 alternate along a stack direction z. As shown in the drawings herein, the stack direction z in which layers of multilayer stacks are stacked is orthogonal to directions x and y which define substantially planar shapes of the layers and which define planes shown in plan views. For example, the multilayer stack 100 can be disposed on surface of a substrate, the surface of the substrate defined in an x/y plane, and the stack direction z can be orthogonal to the surface of the substrate. In addition, the direction y can be a transmission direction defining a direction of signal transmission (e.g., down a length of the multilayer stack 100), and the direction x can be a lateral direction that is orthogonal to the transmission direction y and the stack direction z.

The multilayer stack 100, as a whole, behaves as a superconductor with a superconducting gap frequency that can be selected/configured by selection of the thicknesses and compositions of the layers 102, 104. Accordingly, the multilayer stack 100 can behave as a filter with a cutoff frequency that can be set by design of the layers of the multilayer stack. For example, thicker second-type layers 102 and/or thinner first-type layers 104 tend to result in a lower stack superconducting gap frequency, while thinner second-type layer 102 and/or thicker first-type layers 104 tend to result in a higher stack superconducting gap frequency that is closer to the superconducting gap frequency of the first-type layers 104. As such, a target superconducting gap frequency of the multilayer stack 100 can be obtained to selectively filter out photons transmitting through the multilayer stack 100 which have a frequency above twice the gap frequency.

Note that twice the superconducting gap frequency is related to the superconducting critical temperature $T_C$ by the relationship $f_{2\Delta}=3.52k_BT_C/h$, where $f_{2\Delta}$ is twice the superconducting gap frequency, $k_B$ is Boltzmann's constant, and h is Planck's constant. Accordingly, this disclosure (consistent with practice in the art) sometimes refers to gap frequencies using their corresponding superconducting critical temperatures.

In addition to the advantageous selectability of the superconducting gap frequency, in some implementations, multilayer stacks as described herein can exhibit higher low-temperature resistivities (for filtered-out frequencies) than films of a single type of superconductor, providing higher levels of attenuation for frequencies above the cutoff frequency of the filter. For example, although iridium has a superconducting gap frequency that can be useful for remove undesired high-energy photons from microwave signals traveling through a layer of iridium, the resistivity of iridium for filtered-out frequencies (corresponding to a level of attenuation by a filter based on an iridium layer) is relatively low. By contrast, a multilayer stack configured to exhibit, as a whole, the same superconducting gap frequency as iridium can exhibit a higher resistivity/attenuation for photons above twice the superconducting gap frequency, making the multilayer stack more useful as a low-pass filter. For example, in some implementations the multilayer stack is configured to exhibit a residual resistivity ratio between 1 and 30.

The first-type layers 104 can be composed of one or more superconductors, e.g., elemental superconductors and/or combinations/alloys thereof. In some implementations (e.g., as described in reference to FIG. 5) different layers of the first-type layers 104 are composed of different superconductors.

"Superconductor" and "superconductor material," as referred to herein, refer to materials that become superconducting under compatible conditions, e.g., below the superconducting critical temperature, superconducting critical current, and critical magnetic field of the materials. Examples of superconductor materials include aluminum, niobium, titanium, niobium nitride (NbN), niobium-titanium (NbTi), tungsten, tantalum, and titanium-tungsten (TiW). Non-limiting examples of classes of superconductor materials within the scope of this disclosure (e.g., for use as first-type layers 104) include elemental superconductors, alloy superconductors, ceramic superconductors (e.g., yttrium barium copper oxide (YBCO) and magnesium diboride), and organic superconductors.

During operation, the filters described herein can be maintained at a temperature lower than the superconducting critical temperatures of the multilayer stacks of the filters. For example, a filter including a multilayer stack can be disposed inside a refrigerator (e.g., a dilution refrigerator) configured to maintain a cryogenic temperature lower than the superconducting critical temperature of the multilayer stack.

Referring again to FIG. 1, non-limiting examples of non-superconductor metals that can be used as a second-type layer 102 include copper, gold, silver, platinum, palladium, copper, and alloys of these and/or other metals. For example, a multilayer stack can include a Ti/Pt bilayer. When a second-type layer 102 is composed of a superconductor material, the superconductor material of the second-type layer 102 has a lower critical temperature than a superconductor material of the first-type layer 104. For example, in the multilayer stack 100, the first-type layers 104 can be aluminum layers (superconducting critical temperature $T_C$=1.20 K) and the second-type layers 102 can be titanium layers ($T_C$=0.39 K). In some implementations, when the first-type layers 104 and the second-type layers 102 are both superconductor layers, the multilayer layer stack 100 exhibits a superconducting critical temperature between the respective superconducting critical temperatures of the superconductors. For example, in the case of aluminum and titanium first-type and second-type layers, respectively, the stack can be configured to exhibit a superconducting critical temperature between 0.39 K and 1.20 K and a superconducting gap frequency between the gap frequencies corresponding to 0.39 K and 1.20 K. By varying the relative thickness of the two types of layers, the multilayer stack can be configured to exhibit a target superconducting gap frequency for filtering.

Other non-limiting examples of low-gap superconductor materials that can be used as second-type layers 102 include iridium, hafnium, ruthenium, zinc, molybdenum, hafnium, and alloys thereof. Any or all of these materials can instead or additionally be used as the first-type layers 104 themselves, e.g., in conjunction with non-superconductor metal layers or even smaller-gap superconductor layers.

Figure 2:
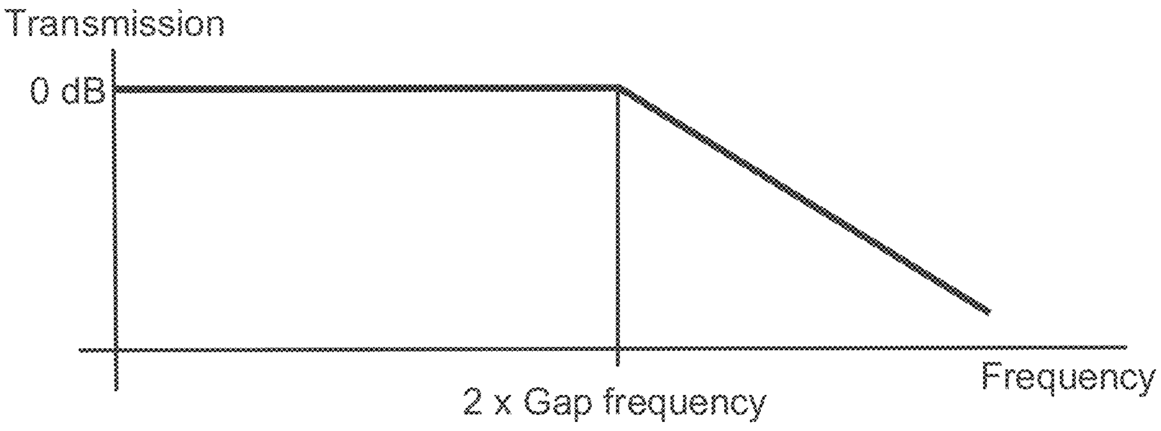
FIG. 2 is a diagram illustrating filtering.

FIG. 2 illustrates a simplified example of attenuation by a multilayer stack. The x-axis represents the frequency of a photon or signal component traveling through the stack and the y-axis represents transmission by the stack. Below twice the gap frequency, photons/signals are fully transmitted (experience 0 dB attenuation). Above twice the gap frequency, photons/signals are attenuated, with the level of attenuation increasing at higher frequencies. Accordingly, the multilayer stack behaves as a low-pass filter with a cutoff frequency equal to twice the gap frequency.

Some filters described herein can be referred to as "microwave" filters because they have a low-pass cutoff frequency in the microwave frequency range, so as to transmit some microwave frequencies and filter out other microwave frequencies. For example, in some implementations, the multilayer stack is configured to exhibit a value of 2×superconducting gap frequency between 8 GHz and 50 GHz, such as between 10 GHz and 20 GHz. In some implementations, 2×superconducting gap frequency is approximately 12 GHz. In some implementations, the multilayer stack is configured to exhibit a superconducting critical temperature between 110 mK and 680 mK.

In some implementations, to facilitate desired current levels, the multilayer stack is configured to exhibit a superconducting critical current between 0.1 mA and 25 mA. The superconducting critical current can be configured, for example, by selection of materials of the multilayer stack, by adjusting thicknesses of the layers (one or both of the first-type layers and second-type layers), and/or by adjusting a number of the layers (e.g., to increase an overall thickness of the multilayer stack, corresponding to a higher superconducting critical current of the multilayer stack as a whole). In some implementations, to provide a desired high level of attenuation for filtered-out frequency components, the multilayer stack is configured to exhibit a cold temperature sheet resistance between 0.1 Ω/square and 10 Ω/square for at least some temperatures between 8 mK and 200 mK. The cold temperature sheet resistance is the sheet resistance for signal components above twice the superconducting gap frequency. The cold temperature sheet resistance can be configured, for example, by selection of materials of the multilayer stack (e.g., where a lower-gap first-type material can be used to increase the sheet resistance), by adjusting thicknesses of the layers (one or both of the first-type layers and second-type layers, e.g., where a higher relative thickness of the second-type layer can be used to increase the sheet resistance), and/or by adjusting a number of the layers (e.g., to decrease an overall thickness of the multilayer stack, corresponding to a higher sheet resistance).

Dimensions and thicknesses of the layers of the multilayer stack can vary in different implementations. In some implementations, the first-type layers and the second-type layers each have a thickness between 10 nm and 100 nm, e.g., between 20 nm and 60 nm. These thicknesses may be well-suited for configuring multilayer stacks with a desired 2×superconducting gap frequency between 8 GHz and 50 GHz. The thicknesses of the first-type layer(s) and the second-type layer(s) within a multilayer stack can be the same or different, and different first-type layer(s) and different second-type layer(s) within a multilayer stack can have the same or different thicknesses. Besides the thicknesses of each layer, a thickness of the multilayer stack as a whole can be configured (e.g., by increasing a number of pairs of first-type/second-type layers) so that a target current can travel through the multilayer stack without exceeding the stack's superconducting critical current.

The multilayer stacks can be implemented in various forms and used in various contexts, such as on-chip, packaging-integrated, and cable-integrated. For example, in some implementations the multilayer stack is disposed on a substrate, and a quantum computing device is disposed on the substrate or another substrate. The quantum computing device is arranged to couple to a signal that is filtered by the filter including the multilayer stack. For example, the quantum computing device can be a qubit, a qubit readout resonator, a qubit control element (e.g., a pad that couples to a qubit), etc., and the signal can be a qubit control signal, a qubit readout signal, a reset signal, etc. The quantum computing device can couple to the signal as the signal is transmitted through the multilayer stack, and/or the multilayer stack can transmit the signal to another signal-carrying circuit element such as a coplanar waveguide, stripline, or microstrip line (which can be, though need not be, a filtering multilayer stack) which couples to the quantum computing device.

Figure 3A:
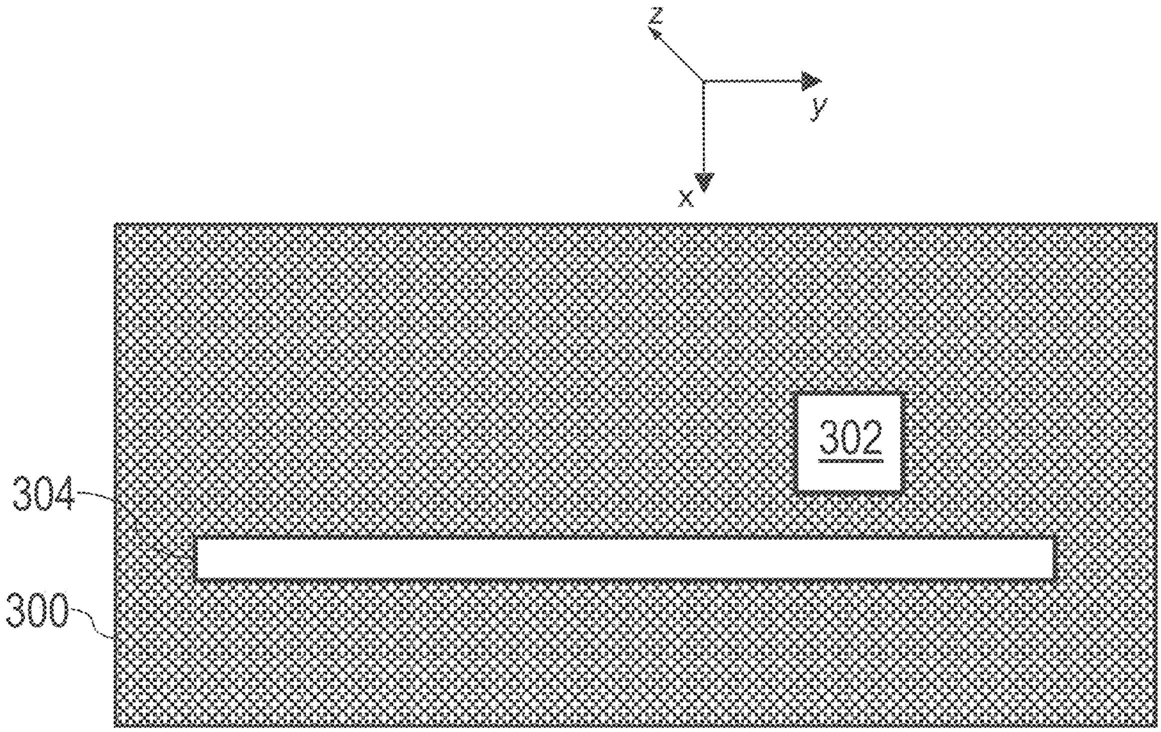
FIG. 3A is a plan-view diagram illustrating an example of a filter.

For example, as shown in FIG. 3A, a quantum computing device 302 and a multilayer stack 304 of a filter are disposed on and/or in a substrate 300. The multilayer stack 304 is shown in a plan view, perpendicular to a cross-sectional view such as that shown in FIG. 1, in which the stack direction z is in/out of the page and directions x and y define planes of the view. For example, the multilayer stack 304 has a generally elongated shape (e.g., as a trace extending on and/or in the substrate 300), and a signal filtered by the multilayer stack 304 propagates in the direction of elongation, the transmission direction y. The signal can couple to the quantum computing device 302 arranged adjacent to the multilayer stack 304 (e.g., spaced apart from the multilayer stack 304 in the lateral direction x). The multilayer stack 304 can be configured in a signal-carrying configuration such as a coplanar waveguide, a stripline, or a microstrip line, e.g., as described with respect to FIGS. 4-7.

Figure 3B:
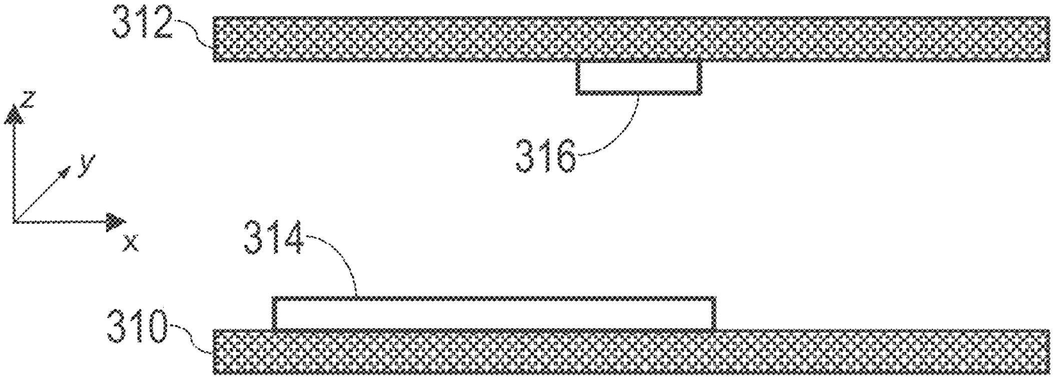
FIG. 3B is a cross-sectional diagram illustrating an example of a filter.

As another example, as shown in FIG. 3B in a cross-sectional view, a first substrate 310 (e.g., a carrier chip) and a second substrate 312 (e.g., a qubit chip) are arranged in a flip-chip configuration. A multilayer stack 314 is arranged in and/or on the first substrate 310, so as to carry signals that couple to a quantum computing device 316 arranged in and/or on the second substrate 312. For example, the quantum computing device 316 can be arranged directly above (aligned with) a portion of the multilayer stack 314. The substrates 310, 312 can be spaced apart from one another in the stack direction z of the multilayer stack 314.

As noted above, for on-chip and other implementations of the filtering multilayer stacks described herein, the multilayer stack need not be arranged for coupling to a quantum computing device. Rather, in some implementations the multilayer stack is configured as a signal-carrying element for routing signals on/in a chip/substrate (and filtering the signal), without necessarily coupling to a quantum computing device.

In some implementations, the multilayer stack itself forms all or a portion of a quantum computing device. For example, a meandering/spiral multilayer stack can form a qubit readout resonator that (i) couples to a qubit for readout and (ii) filters signals transmitting in the qubit readout resonator.

The substrates 300, 310, 312, and other substrates described herein, can be any suitable type of substrate, e.g., a semiconductor substrate (e.g., a silicon substrate), a dielectric substrate (e.g., a glass or sapphire substrate), or a circuit board (e.g., a printed circuit board (PCB) composed of a laminate such as FR-4). In some implementations, a substrate includes multiple materials/layers. For example, a dielectric layer (e.g., alumina) can be formed on an underlying semiconductor substrate, and the dielectric layer can be used as a dielectric material in a stripline, microstrip line, or coplanar waveguide configuration of the multilayer stack, e.g., as described in reference to FIGS. 4-7.

Figure 4:
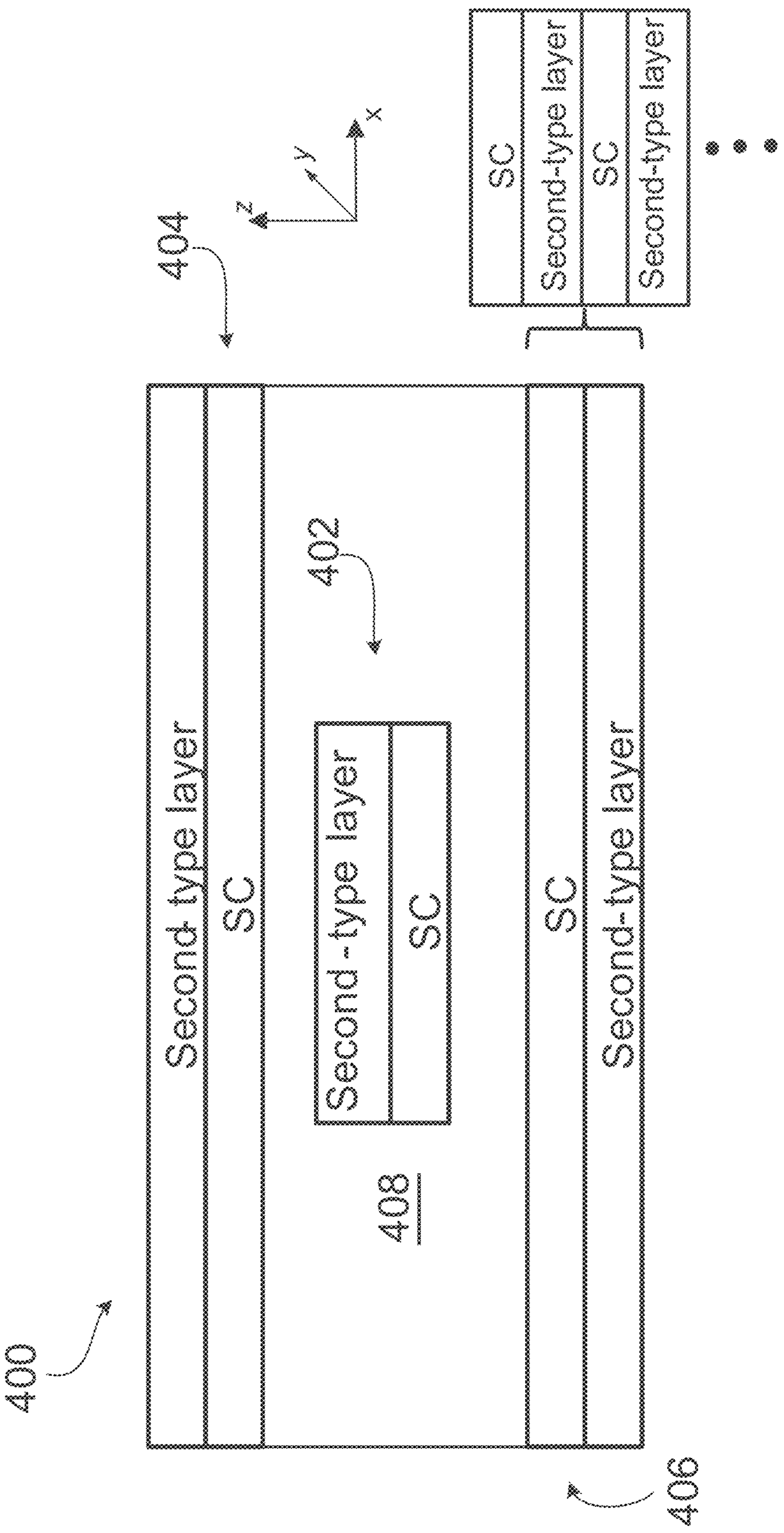
FIGS. 4-6 are cross-sectional diagrams illustrating examples of filters.

FIG. 4 illustrates an example of a filter 400 (shown in cross-sectional view) having multilayer stacks arranged in a stripline configuration. A first multilayer stack 402 is embedded in a dielectric layer 408, e.g., a polyimide such as kapton, an oxide such as alumina, or a nitride such as silicon nitride. Second and third multilayer stacks 404, 406 are arranged on first and second sides of the dielectric layer 408, respectively, sandwiching the dielectric layer 408 in which the first multilayer stack 402 is embedded. In this example, each multilayer stack 402, 404, 406 is a bilayer stack having one first-type layer (e.g., titanium) and one second-type layer (e.g., copper), but, as shown in the inset drawing, the number of layers can be scaled to obtain the desired stack thickness (e.g., corresponding to a target superconducting critical current). Moreover, the multilayer stacks 402, 404, 406 need not be identical, e.g., can differ from one another in thickness, number of layers, composition (e.g., type(s) of materials of the first-type and second-type layers), and/or other parameters.

In the filter 400 having the stripline configuration, the first multilayer stack 402 acts as a central conductor, and the second and third multilayer stacks 404, 406 act as ground planes, e.g., which may be shorted to one another. Accordingly, signals can be transmitted with low noise/interference and filtered by the multilayer stacks. Signals are transmitted in the illustrated transmission direction y which is orthogonal to the stack direction z of the stacks 402, 404, 406 and orthogonal to the lateral direction x, where the lateral direction x and the transmission direction y together define a plane corresponding to substantially planar shapes of the multilayer stacks 402, 404, 406. In some implementations, a width of the first multilayer stack 402 in the lateral direction x is less than widths of the second and third multilayer stacks 404, 406 in the lateral direction x, e.g., so that footprints of the second and third multilayer stacks 404, 406 orthogonal to the stack direction z (in a plan view) encompass and are larger than a footprint of the first multilayer stack 402. The second and third multilayer stacks 404, 406 can be planar, e.g., effectively infinite compared to the lateral extent of the first multilayer stack 402.

The filter 400 can be arranged on-chip (e.g. on a surface of an underlying substrate), in packaging, and/or can be embedded in a cable, e.g., a flexible cable. Accordingly, a filtering function can be provided in cabling to/from devices such as quantum computing processors (the cable itself being a filter). A flexible polyimide dielectric, such as kapton, can extend along the cable and encapsulate the inner multilayer stack as the dielectric layer 408. An insulating material, such as rubber, can coat an exterior of the cable for insulation and physical protection.

Figure 5:
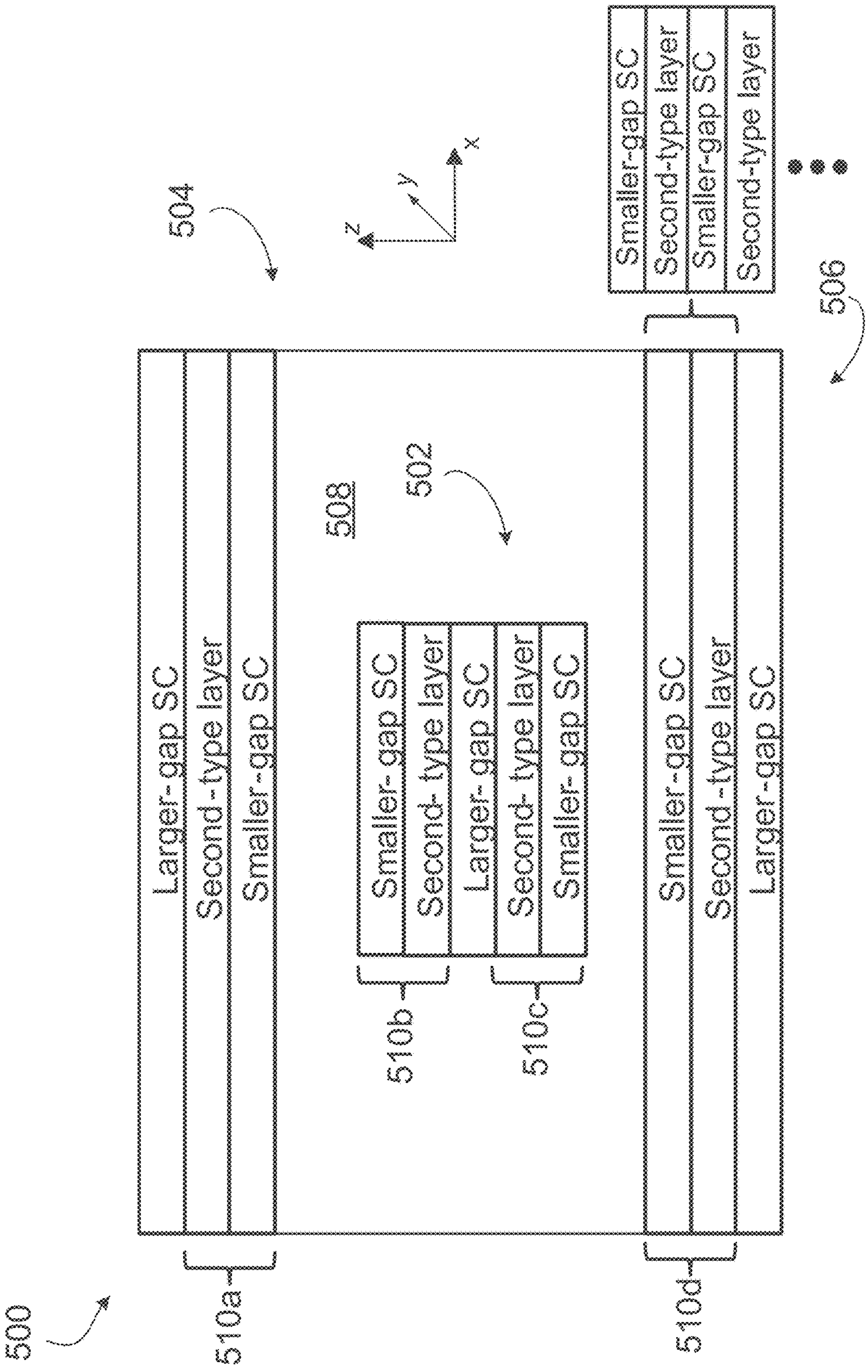

FIG. 5 illustrates another example of a filter 500 having a stripline configuration with a dielectric 508. The filter 500 and elements thereof can have characteristics as described for the filter 400, except where indicated otherwise. In this example, the first-type layers include two layer sub-types composed of different superconductor materials: a larger-gap SC and a smaller-gap SC. For example, the larger-gap SC can be niobium ($T_C$=9.26 K), and the smaller-gap SC can be titanium ($T_C$=0.39 K). The two sub-types of first-type layer can correspond to different portions of the multilayer stack through which different photon/signal frequencies transmit. For example, a larger-gap SC (higher-$T_C$ and higher critical current density ($J_C$)) first-type layer can be arranged in a portion of the multilayer stack through which predominantly DC/lower-frequency signal components are transmitted, and a smaller-gap SC (lower-$T_C$ and lower $J_C$) first-type layer can be included in a "skin depth" region of the multilayer stack that transmits most or all of the higher-frequency components (e.g., RF frequencies and higher and/or microwave frequencies and higher). Accordingly, the larger-gap SC can carry high current levels without losing superconductivity based on its higher $J_C$ (and without having to perform filtering, because the DC/low-frequency components are in the desired pass-band of the filter), while the smaller-gap SC can perform filtering on higher-frequency components that are mostly localized in the skin-depth region. In some implementations, the larger-gap SC layer can be thicker than the smaller-gap SC layer(s), to increase the critical current of the larger-gap SC layer and permit higher current levels to travel through the larger-gap SC without the larger-gap SC losing its superconductivity.

In some implementations, the smaller-gap SC of the first-type layers is stacked with second-type layers in the skin depth region, to form a sub-stack having a target gap frequency for filtering. For example, as shown in FIG. 5, selectable-gap-frequency sub-stacks of one or more smaller-gap SC layers and one or more second-type layers (in this example, bilayer stacks having one of each layer type) are arranged in skin-depth regions 510*a*, 510*b*, 510*c*, 510*d*. In this example, the skin-depth regions 510*a*, 510*b*, 510*c*, 510*d* having the sub-stacks are located at inner portions of the ground-plane/shielding multilayer stacks 504, 506 of the stripline configuration of the filter 500, and at outer portions of the inner multilayer stack 502 of the stripline configuration. Outside the skin-depth regions 510*a*, 510*b*, 510*c*, 510*d* (e.g., at a central/inner portion of the inner multilayer stack 502 and at outer portions of the ground-plane/shielding multilayer stacks 504, 506), larger-gap SC layers are provided. As noted above, the larger-gap SC layers can—though need not—be thicker than the smaller-gap SC layers, to facilitate higher current flow through the larger-gap SC layers. Moreover, as shown in the inset drawing, the sub-stacks may have more than one layer of each type in an alternating arrangement. In examples in which the smaller-gap SC layers and larger-gap SC layers are close to one another (e.g., in galvanic contact), a composite $T_C$ of the multilayer stacks 502, 504, 506 or portions thereof (e.g., the sub-stacks in the skin-depth regions) can be based on the $T_C$s of both the smaller-gap SC and the larger-gap SC, based on the proximity effect. For example, in the case where the larger-gap SC is niobium ($T_C$=9.26 K), and the smaller-gap SC is titanium ($T_C$=0.39 K), $T_C$ of the multilayer stacks 502, 504, 506 and/or portions thereof (e.g., the sub-stacks in the skin-depth regions) can be between 0.39 K and 9.26 K.

In examples, such as that of FIG. 5, in which the first-type layers include larger-gap SC layers and smaller-gap SC layers, the second-type layers can be composed of (i) non-superconductor metals or (ii) superconductor materials having a lower critical temperature (smaller superconducting gap) than the smaller-gap SC layers. For example, the larger-gap SC layers can be niobium layers ($T_C$=9.26 K), the smaller-gap SC layers can be titanium layers ($T_C$=0.39 K), and the second-type layers can be copper layers (non-superconductor metal); or the larger-gap SC layers can be niobium layers ($T_C$=9.26 K), the smaller-gap SC layers can be tin layers ($T_C$=3.72 K), and the second-type layers can be titanium layers ($T_C$=0.39 K). The two sub-types of first-type layer can equivalently be referred to as first-type layers (smaller-gap SC) and third-type layers (larger-gap SC), respectively.

Figure 6:
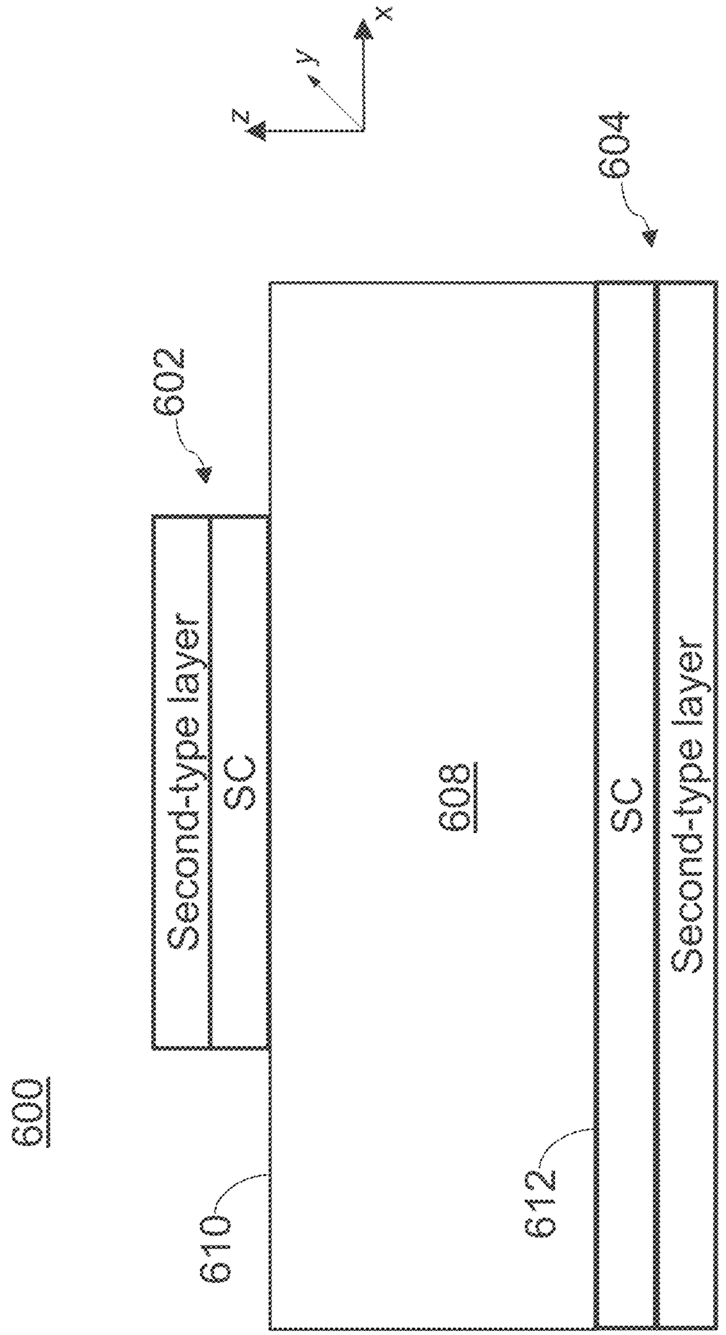

FIG. 6 illustrates an example of a filter 600 including a multilayer stack in a microstrip line configuration. The filter 600 and elements thereof can have characteristics as described for filters 400, 500, except where indicated otherwise. In the filter 600, a first multilayer stack 602 is provided on a first side of a dielectric layer 608, and a second multilayer stack is provided on a second side of the dielectric layer 608. The two sides of the dielectric layer 608 are on opposite sides of the dielectric layer 608 in a stack direction z of the multilayer stacks 602, 604 and correspond to opposite surfaces 610, 612 on which the respective multilayer stacks 602, 604 are disposed. Each multilayer stack 602, 604 includes one or more first-type layers (superconductor layers) and one or more second-type layers (in this example, one of each). The first multilayer stack 602 is configured as a conductor stack of the microstrip line configuration, and the second multilayer stack 604 is configured as a ground plane of the microstrip line configuration. In some implementations, a width of the first multilayer stack 602 in a lateral direction x is less than a width of the second multilayer stack 604 in the lateral direction x, e.g., so that a footprint of the second multilayer stack 604 orthogonal to the stack direction z (in a plan view showing x-y planes) encompasses and is larger than a footprint of the first multilayer stack 602. The second multilayer stack 604 can be planar, e.g., effectively infinite compared to the lateral extent of the first multilayer stack 602.

Signals (e.g., microwave signals) can be transmitted along the microstrip line (in the transmission direction y of the multilayer stack 602, into the drawing of FIG. 6) and be filtered based on the superconducting gap frequencies of the multilayer stacks 602, 604, e.g., with attenuation for photons/signal components above twice the superconducting gap frequency.

As described in reference to FIG. 4, the multilayer stacks 602, 604 need not be identical, e.g., can differ from one another in thickness, number of layers, composition (e.g., type(s) of materials of the first-type and second-type layers), and/or other parameters.

As described in reference to FIG. 5, in some implementations the multilayer stacks of a microstrip line configuration include, as first-type layers, a larger-gap SC and a lower-gap SC having locations corresponding to skin-depth regions. For example, the larger-gap SC can be arranged further from the dielectric layer 608 in the first and/or second multilayer stacks 602, 604, and the smaller-gap SC (forming a multi-layer sub-stack with one or more second-type layers) can be arranged adjacent to the dielectric layer 608 in the first and/or second multilayer stacks 602, 604, in skin-depth regions of the first and/or second multilayer stacks 602, 604.

Figure 7:
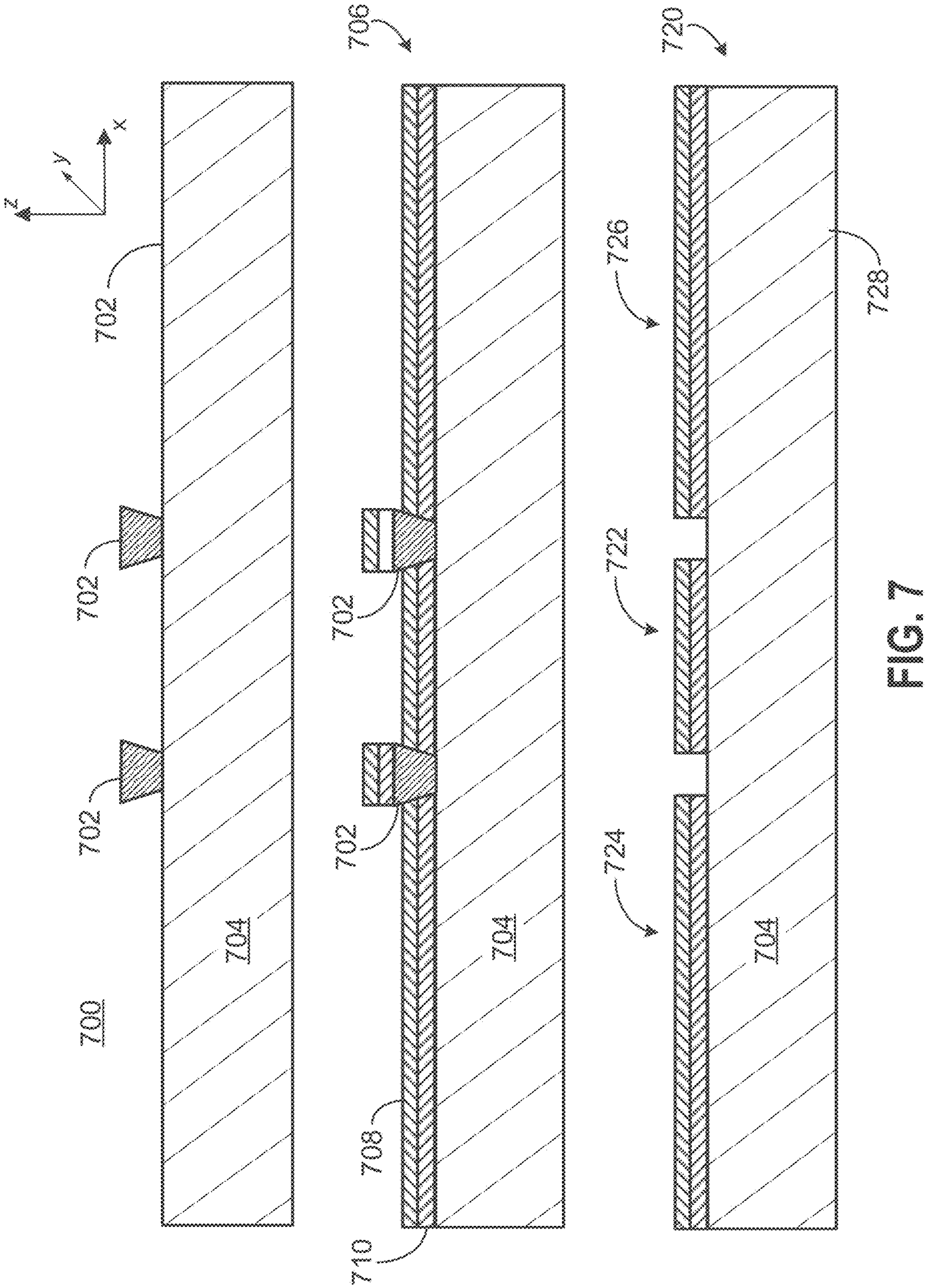
FIG. 7 is a diagram illustrating an example of a process of making a filter.

FIG. 7 illustrates an example of a process 700 for making a filter having a multilayer stack in a coplanar waveguide configuration. A pattern of photoresist 702 is provided on a substrate 704 (e.g., the substrate 704 having characteristics as described for substrates 300, 310, 312, such as a dielectric substrate/layer). The photoresist 702 can be patterned using suitable photolithography processes. A multilayer stack 706 is formed on a surface 712 of the substrate 704, the multilayer stack 706 including one or more first-type layers 710 and one or more second-type layers 708. The multilayer stack 706 can be formed using one or more suitable processes, e.g., physical vapor deposition, chemical vapor deposition, and/or atomic layer deposition.

A liftoff process is performed (e.g., using a solvent bath) to remove the photoresist 702 and form a filter 720 having a first multilayer stack 722 and second and third multilayer stacks 724, 726 laterally separated (in a lateral direction x) from the first multilayer stack 722 on opposite sides of the first multilayer stack 722, the three multilayer stacks 722, 724, 726 co-planar on the surface 712 of the substrate 704. The multilayer stacks 722, 724, 726 form a coplanar waveguide in which the first multilayer stack 722 is a central conducting track and the second and third multilayer stacks 724, 726 are return tracks. In some implementations, the second and third multilayer stacks 724, 726 extend on the substrate 704 far from the first multilayer stack 722, e.g., as effectively semi-infinite planes. The second and third multilayer stacks 724, 726 can be shorted to one another. Signals (e.g., microwave signals) can be transmitted along the coplanar waveguide (in the transmission direction y of the multilayer stack 722, into the drawing of FIG. 7) and be filtered based on the superconducting gap frequencies of the multilayer stacks 722, 724, 726, e.g., with attenuation for signal components above twice the superconducting gap frequency.

In some implementations that include a coplanar waveguide geometry, one or more of the multilayer stacks (e.g., stacks 722, 724, 726) can include both smaller-gap and larger-gap SC layers as described in reference to FIG. 5. For example, in the filter 720, a larger-gap SC layer such as Nb can be in a middle portion of one or more of the stacks 722, 724, 726, with smaller-gap SC layers above and below the large-gap SC layer.

In some implementations, a filter having a coplanar waveguide configuration includes a fourth multilayer stack as a ground plane on a back surface of the substrate, e.g., back surface 728 in FIG. 7. The fourth multilayer stack can be shorted to the second and third multilayer stacks (the return tracks).

Ground planes and return tracks of coplanar waveguide filters, stripline filters, and microstrip filters can be multilayer stacks as described herein, or can be non-multilayers, e.g., aluminum layers. For example, any or all of multilayer stacks 404, 406, 504, 506, 604, 724, and/or 726 can be replaced by a superconductor layer. Moreover, layers 1102 can be replaced by multilayer stacks such as multilayer stacks 724, 726. In implementations in which only the center stack/line or conducting stack/line of a stripline, microstrip line, or coplanar waveguide is a multilayer stack, the superconducting gap frequency of the center stack/line sets the cutoff frequency for the filter.

Although some implementations include multilayer stacks in which first-type layers and second-type layers are co-extensive with one another (have fully overlapping, identical footprints), this need not be the case in general. FIGS.

8A-8E illustrate (in a plan view) examples of multilayer stacks in which footprints of the first-type layer(s) and footprints of the second-type layer(s) are separately indicated. The footprints are areas orthogonal to the stack direction z. In some implementations, the footprints of the first-type layers and second-type layers are different. For example, the footprint of the second-type layers can protrude beyond the footprint of the first-type layers, and/or the footprint of the first-type layers can protrude beyond the footprint of the second-type layers. In some implementations, the footprint of the second-type layers is discontinuous. Different layers can have different footprints, e.g., a first second-type layer can have a first footprint and a second second-type layer can have a second, different footprint.

Figure 8A:
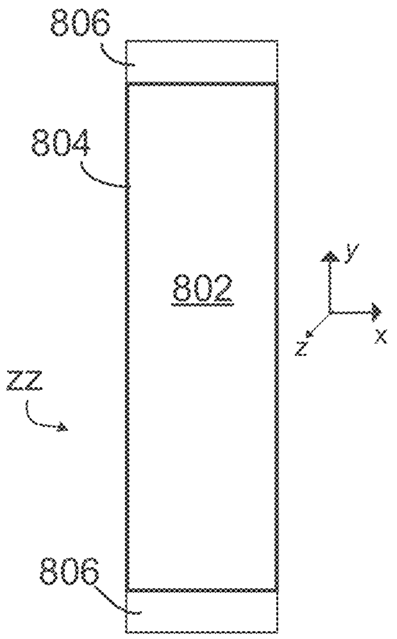
FIGS. 8A-8E are plan-view diagrams illustrating examples of filters.

As shown in FIG. 8A, in a multilayer stack 800, a footprint 802 of a second-type layer overlaps a footprint 804 of a first-type layer. Portions 806 of the footprint 804 do not overlap with the footprint 802. In some implementations, when a signal transmits through a portion 806 of a multilayer stack 800 having the first-type layer (e.g., in a transmission direction y) without an overlapping second-type layer, the signal is not filtered (e.g., with desired low-pass microwave filtering) in that portion 806; the filtering can occur in portions of the multilayer stack 800 in which footprints 802, 804 overlap.

Figure 8B:
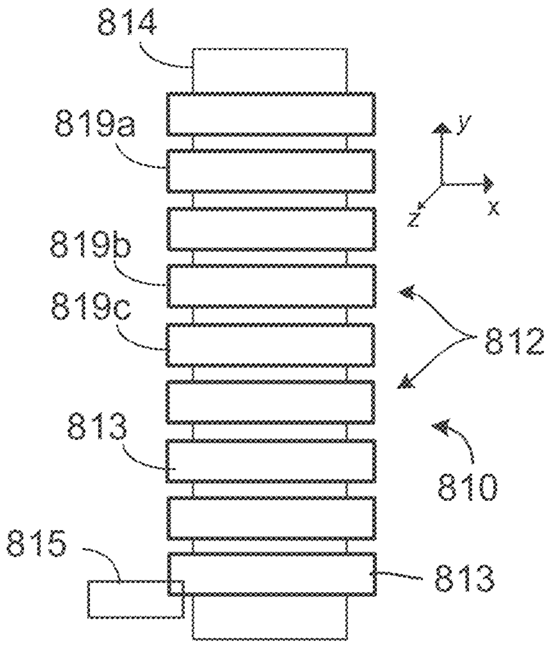

As shown in FIG. 8B, in a multilayer stack 810, a footprint 812 of a second-type layer is discontinuous, e.g., includes separate, non-overlapping/non-touching portions such as portions 819*a*, 819*b*, 819*c*. The portions 819*a*, 819*b*, 819*c* are laterally separated from one another along the transmission direction y of the multilayer stack 810. A footprint 814 of a first-type layer extends to overlap with the separate portions of the footprint 812 and includes portions that do not overlap the footprint 812. The footprint 812 protrudes beyond the footprint 814, e.g., in the lateral direction x orthogonal to the transmission direction y and orthogonal to the stack direction z. In various implementations, the footprint 812 can protrude beyond the footprint 814 on one or both lateral sides of the footprint 812 (shown as both lateral sides in FIG. 8B). In some implementations, lateral protrusions of the second-type layer (e.g., protrusions 813) are connected to one or more thermalization paths, e.g., metal traces and/or metal vias 815. This can promote thermalization in the filter 810 and reduce heating of the multilayer stack 810, e.g., due to the multilayer stack's dissipation function.

Figure 8C:
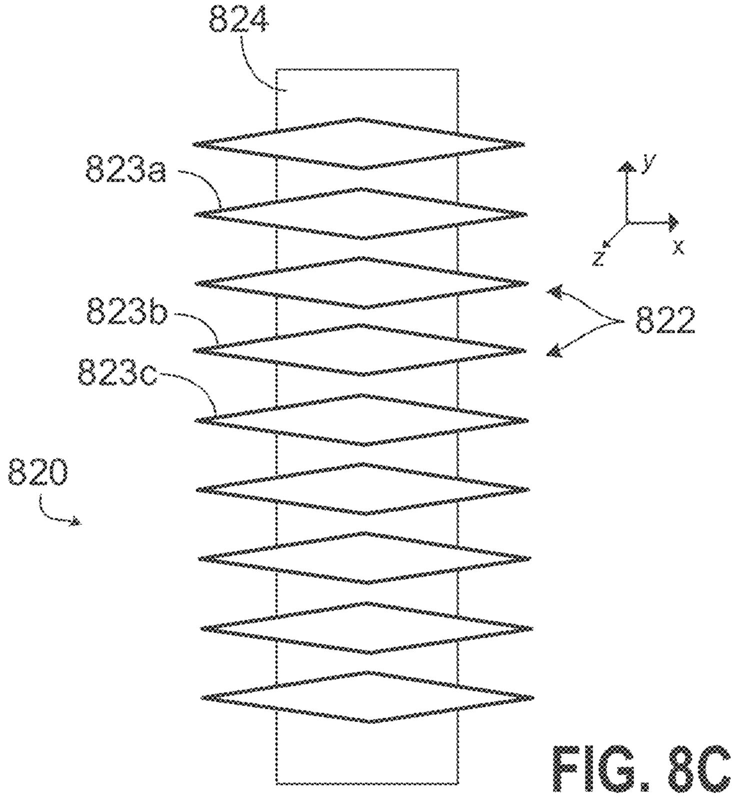
Figure 8D:
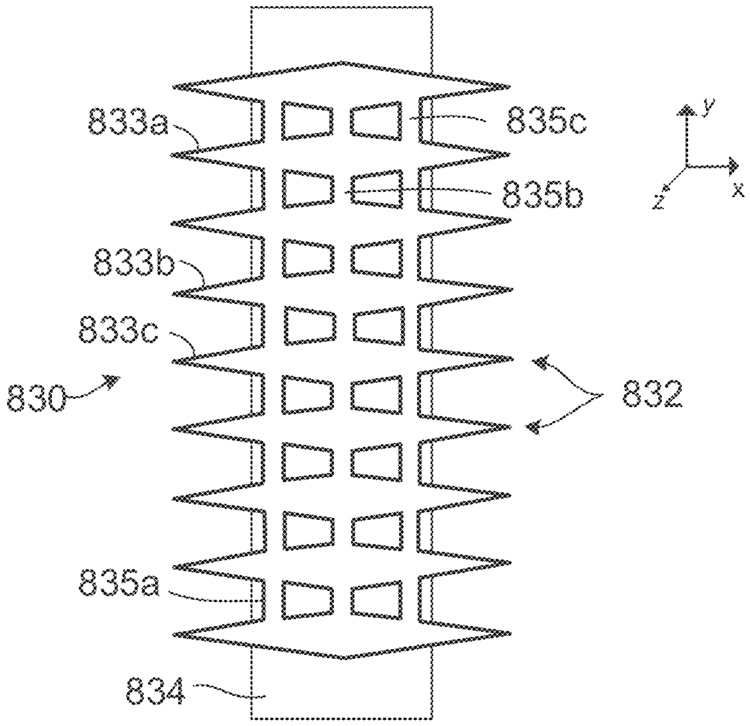
Figure 8E:
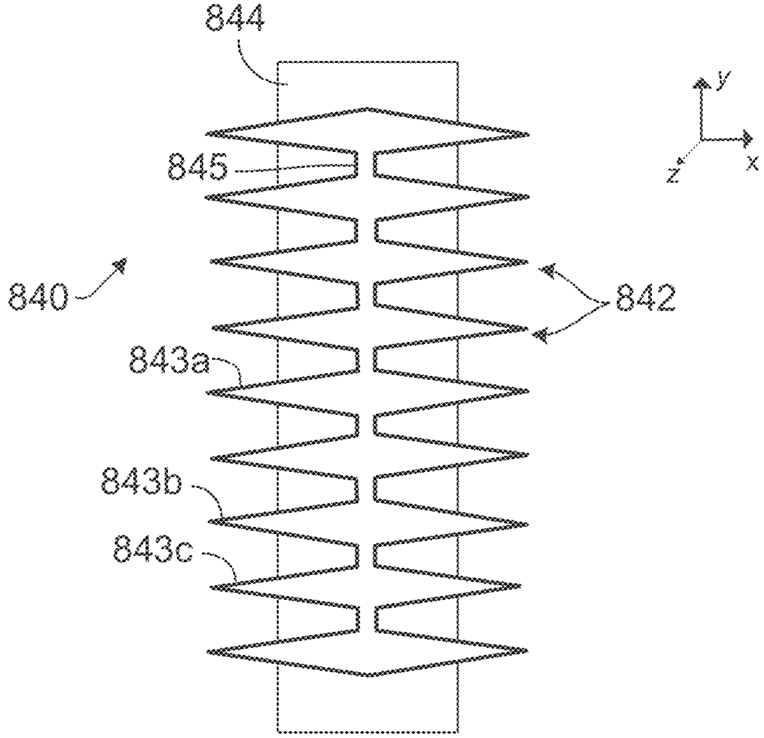

Various shapes of the footprints are within the scope of this disclosure. In FIG. 8B, each portion 819*a*, 819*b*. 819*c* of the footprint 812 has a substantially rectangular shape in the plan view. As shown in FIG. 8C in a plan view, in another example of a multilayer stack 820, each portion 823*a*, 823*b*, 823*c* (discontinuous from one another and laterally separated along the transmission direction y of the multilayer stack 820) of a footprint 822 of a second-type layer has a polygonal shape that is widest at a location of overlap with a footprint 824 of a first-type layer and narrows to a point protruding beyond the footprint 824 in the lateral direction x. As shown in FIG. 8D in a plan view, in another example of a multilayer stack 830, portions 833*a*, 833*b*, 833*c* (laterally separated along the transmission direction y of the multilayer stack 830) of a footprint 832 of a second-type layer are connected by lengthwise portions 835*a*, 835*b*, 835*c* of the footprint 832 that extend in the transmission direction y. The lengthwise portions 835*a*, 835*b*, 835*c* overlap with a footprint 834 of a first-type layer. The portions 833*a*, 833*b*, 833*c* protrude beyond the footprint 834 in the lateral direction x. As shown in FIG. 8E, in another example of a multilayer stack 840, portions 843*a*, 843*b*, 843*c* (laterally separated along the transmission direction y of the multilayer stack 840) of a footprint 842 of a second-type layer are connected by a single lengthwise portion 845 of the footprint 842 that extends in the transmission direction y. The lengthwise portion 845 overlaps with a footprint 844 of a first-type layer. The portions 843*a*, 843*b*, 843*c* protrude beyond the footprint 844 in the lateral direction x. The portions 833*a*, 833*b*, 833*c* and 843*a*, 843*b*, 843*c* of FIGS. 8D-8E have narrowing shapes as described in reference to portions 823*a*, 823*b*, 823*c*.

Figure 9A:
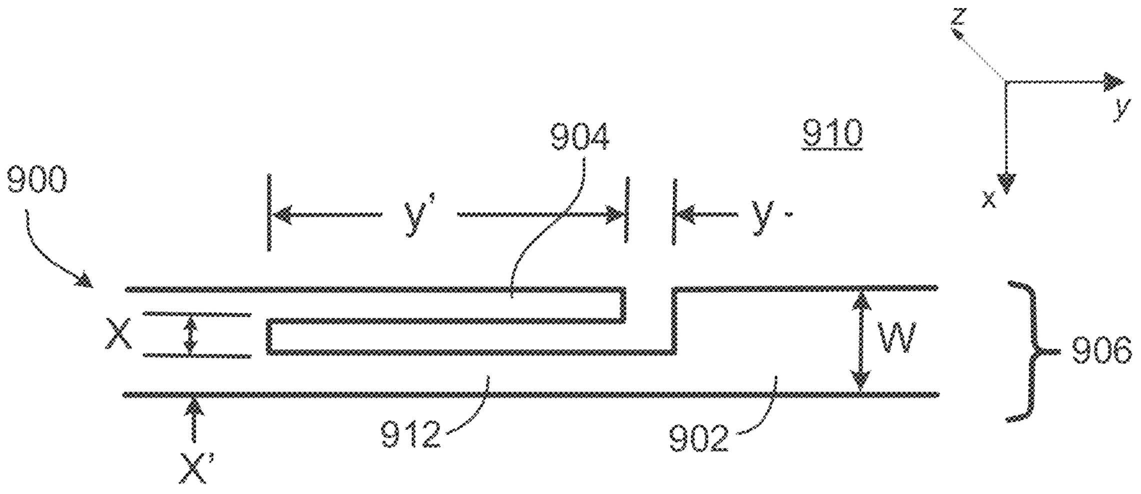
FIGS. 9A-9B are plan-view diagrams illustrating examples of geometries of multilayer stacks.

In some implementations, a multilayer stack has a shape, in a plan view, that provides an additional filtering effect besides the low-pass filter behavior provided by the superconducting gap frequency of the multilayer stack. For example, as shown in FIG. 9A in a plan view, a filter 900 includes a multilayer stack 902. An area 910 surrounding the multilayer stack 902 in the plan view can be, for example, a substrate (e.g., a dielectric layer) on which the multilayer stack 902 is disposed. Signals are transmitted through the multilayer stack 902 generally in the transmission direction y. The illustrated footprint of the multilayer stack 902 can be the footprint of all layers of the multilayer stack 902, or the footprint can be the footprint of one or more layers of the multilayer stack 902. For example, the illustrated footprint can be the footprint of one or more first-type layers of the multilayer stack 902, or the footprint of one or more first-type layers and one or more second-type layers of the multilayer stack 902. In some implementations, the illustrated footprint is the footprint of all first-type layers of the multilayer stack 902. The multilayer stack 902 can be, for example, the center stack/line or conducting stack/line of a stripline, microstrip line, or coplanar waveguide, e.g., multilayer stack 402, 502, 602, or 722.

The multilayer stack 902 has a shape that includes a spurline 904. The spurline 904 causes the filter including the multilayer stack 902 to behave as a notch filter (band-stop filter) for photons/signal components in a frequency range defined by the geometry of the multilayer stack 902. For example, in some implementations, the spurline length y' is equal to $\lambda_g/4$, where $\lambda_g$ is the wavelength corresponding to the center rejection frequency of the notch filter in the material of the multilayer stack 902. Other geometric parameters of the multilayer stack 902 (such as y, x, x', and/or W, as shown in FIG. 9A) can be configured to adjust $\lambda_g$ and/or the stop band width of the notch filter.

In various implementations, the center rejection frequency can be above or below twice the superconducting gap frequency of the multilayer stack. In some implementations, the stop band of the notch filter (based on the shape of the multilayer stack) includes twice the superconducting gap frequency of a material. For example, in some implementations the stop band includes 88 GHz, corresponding to the twice the superconducting frequency of aluminum. A stop band at higher frequencies than twice the superconducting gap frequency of the multilayer stack can be useful even given the existing filtering of those frequencies based on the attenuation by the multilayer stack, e.g., because certain of the higher frequencies may be particularly sensitive for operation of the device (such as twice the superconducting gap frequency of material) and/or because certain of the higher frequencies may correspond to high intensities of environmental interference. The shape of the multilayer stack can be configured so that the stop band includes these frequencies, to filter out signal components to which device operation is particularly sensitive and/or to filter out undesired signal components that may be high-intensity.

In some implementations, the stop band of the notch filter corresponds to a cavity mode associated with packaging of the filter, e.g., the stop band may overlap some or all of the range 8 GHz to 10 GHz, which may be below twice the superconducting gap frequency of the multilayer stack. As another example, in some implementations the shape of the multilayer stack is configured so that the stop band includes a pump frequency of an amplifier that contributes to a signal in the multilayer stack, e.g., 10 GHz.

The spurline geometry can advantageously be formed within a pitch 906 of the multilayer stack 902, e.g., to facilitate more efficient use of space. In some implementations, a portion 912 of the multilayer stack 902 that has a reduced width (in a lateral direction x) because of the presence of the spurline 904 (e.g., the portion 912 adjacent to the spurline 904) is thicker than one or more portions of the multilayer stack 902 that have a larger width in the lateral direction x, e.g., one or more portions that are not adjacent to the spurline 904. This can reduce the current density in the portion 912 to maintain current levels above the superconducting critical current of the multilayer stack 902.

A multilayer stack can have a shape that includes zero, one, or multiple spurlines to behave as zero, one, or multiple notch filters, which may have the same or different respective stop bands.

Figure 9B:
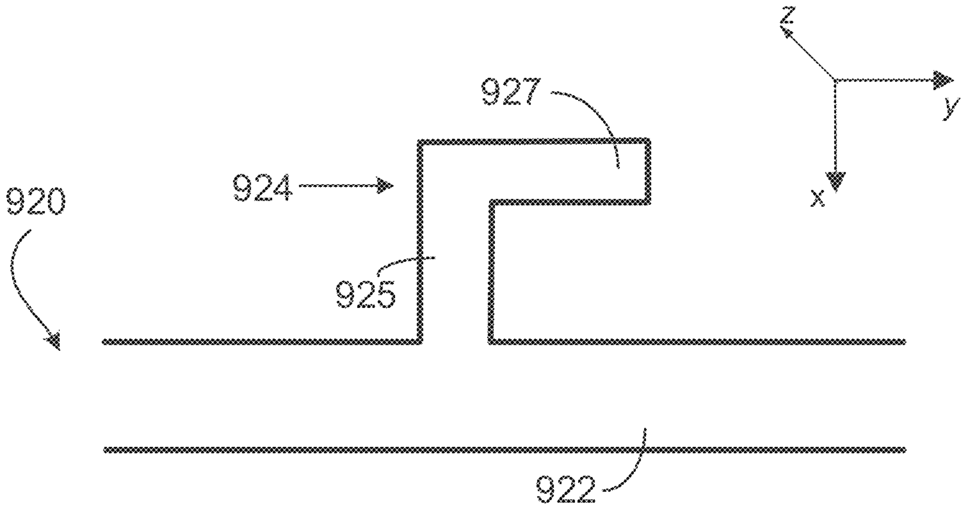

In some implementations, instead of or in addition to a spurline geometry, a multilayer stack includes a stub geometry that can cause the multilayer stack to behave as a filter in addition to the filtering based on the superconducting gap frequency. For example, as shown in FIG. 9B in a plan view, a filter 920 includes a multilayer stack 922 having a transmission direction y. The multilayer stack 922 has a shape that includes a stub 924 projecting (e.g., in a lateral direction x) from the adjacent portion of the multilayer stack 922. In some implementations, the stub 924 includes a first portion 925 extending from the adjacent portion of the multilayer stack 922 in the lateral direction x, and a second portion 927 extending from the first portion in the transmission direction y. As described in reference to FIG. 9A, the indicated footprint of the multilayer stack 922 can be the footprint of one, some, or all layers of the multilayer stack 922. The multilayer stack 922 can be, for example, the center stack/line or conducting stack/line of a stripline, microstrip line, or coplanar waveguide, e.g., multilayer stack 402, 502, 602, or 722.

The geometry of the multilayer stack 922 (e.g., shape(s), length(s) and/or width(s) of the stub 924 or portion(s) thereof) can be configured to set one or more filter parameters. For example, in some implementations, the stub 924 causes the multilayer stack 922 to behave as a notch filter, and a geometry of the stub 924 can be configured to set the center frequency and/or stop width of the notch filter. For example, the notch filter can have any of the frequency properties described for the notch filter of FIG. 9A. In some implementations, the geometry causes the multilayer stack 922 to behave as a bandpass filter or a low-pass filter, e.g., using serially-connected stubs.

Other multilayer stack geometries besides spurline and notch can instead or additionally be used to cause various filter behaviors, e.g., spiral-shaped, hairpin-shaped, and/or another suitable shape to form a notch filter, a low-pass filter, a bandpass filter, a high-pass filter, and/or another filter type.

Figure 10:
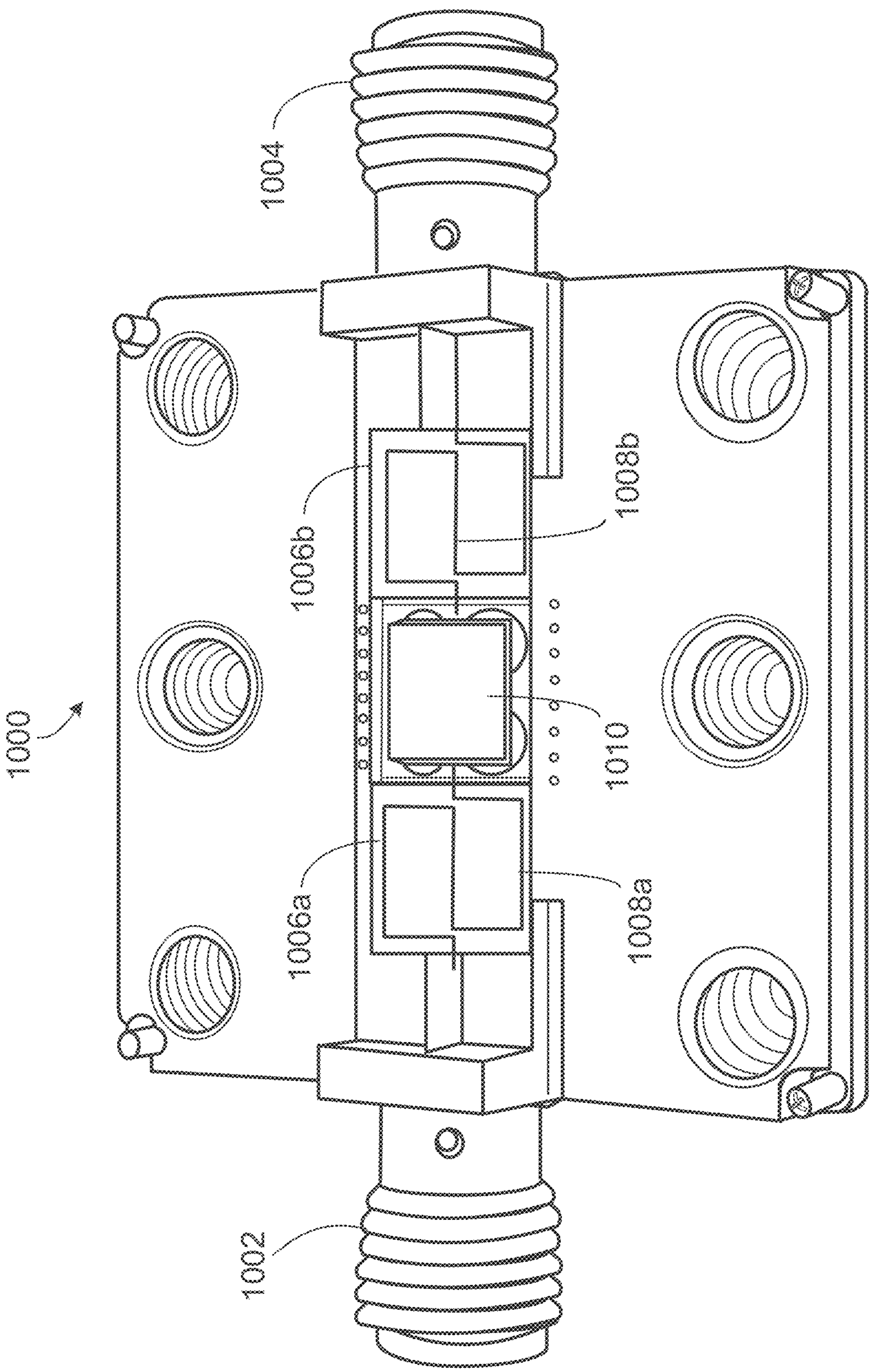
FIG. 10 is a diagram illustrating an example of packaging including a filter.

FIG. 10 illustrates an example of filters including multilayer stacks integrated into packaging 1000. The packaging 1000 includes a signal input 1002 and a signal output 1004, e.g., ports configured to receive respective coaxial cables. A signal (e.g., microwave signal) received at the signal input 1002 is provided to a first meandering multilayer stack 1008*a* on a first substrate 1006*a*, e.g., in a microstrip line configuration or a coplanar waveguide configuration. For example, the first substrate 1006*a* can be a PCB wirebonded to the signal input 1002. Some or all traces in/on the PCB can be multilayer stacks configured to behave as filters. In some implementations, the wirebond can be a multilayer stack, e.g., gold wire plated with titanium. Optional components of the packaging 1000 include a copper thermalization plate on the PCB and one or more shields to block RF, infrared, and/or magnetic interference. Components of the input signal having a frequency above twice a superconducting gap frequency of the first meandering multilayer stack 1008 are attenuated. The filtered signal is provided to a circuit device 1010, which can include (but is not limited to), for example, a quantum computing circuit including one or more qubits, one or more qubit readout resonators, and/or one or more qubit control lines. An output microwave signal can be provided out of the circuit device 1010 through a second meandering multilayer stack 1008*b* on a second substrate 1006*b*, the second meandering multilayer stack 1008*b* filtering the output microwave signal as described throughout this disclosure. The filtered output signal is provided at the signal output 1004.

Figure 11:
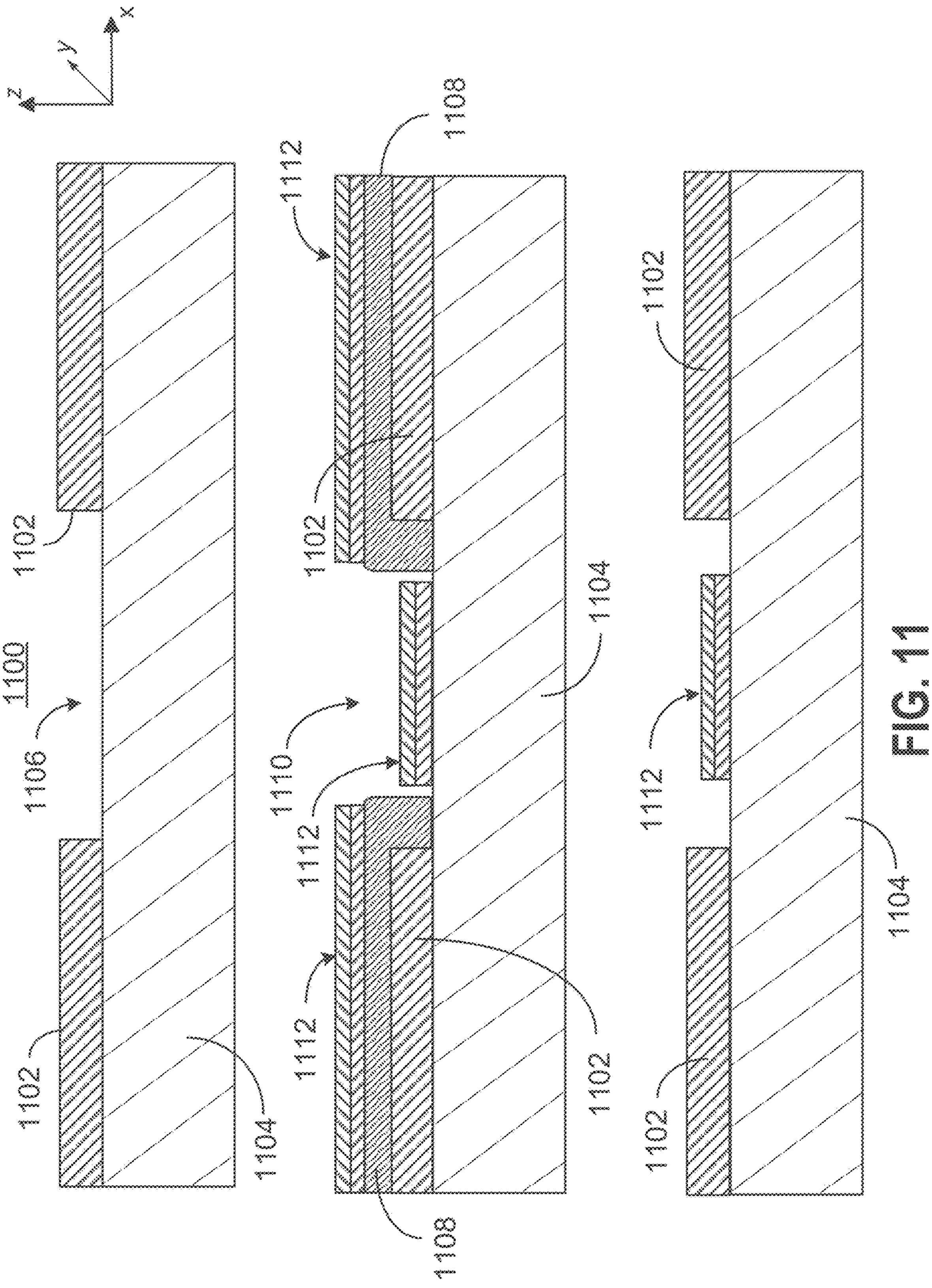
FIG. 11 is a diagram illustrating an example of a process of making a filter.

FIG. 11 illustrates another example of a process 1100 for fabricating a filtering multilayer stack in a coplanar waveguide configuration. A superconductor layer 1102 is provided on a substrate 1104 with a gap 1106 separating laterally spaced-apart portions of the superconductor layer 1102, e.g., using photolithography or a shadow-mask process. A layer of photoresist 1108 is provided with an opening 1110 co-located with the gap 1106, and a multilayer stack 1112 (in this example, a bilayer stack including one first-type layer and one second-type layer) is formed in the opening 1110 and on the photoresist 1108. The photoresist 1108 is removed in a liftoff process to leave the central multilayer stack 1112 and adjacent, laterally spaced-apart first-type layers 1102 on a surface of the substrate 1104. These layers 1102 and the central multilayer stack 1112 together form a filter having a coplanar waveguide configuration, in which signals transmitted through the central multilayer stack 1112 are filtered based on a superconducting gap frequency of the central multilayer stack 1112. The layers 1102 can be shorted together as a ground plane, e.g., as described in reference to FIG. 7.

Analogous processes to those of FIGS. 7 and 11 (including, for example, photolithography, material deposition/growth, etching/liftoff, etc.) can be used to form filters having other configurations, e.g., stripline and microstrip line.

Figure 12:
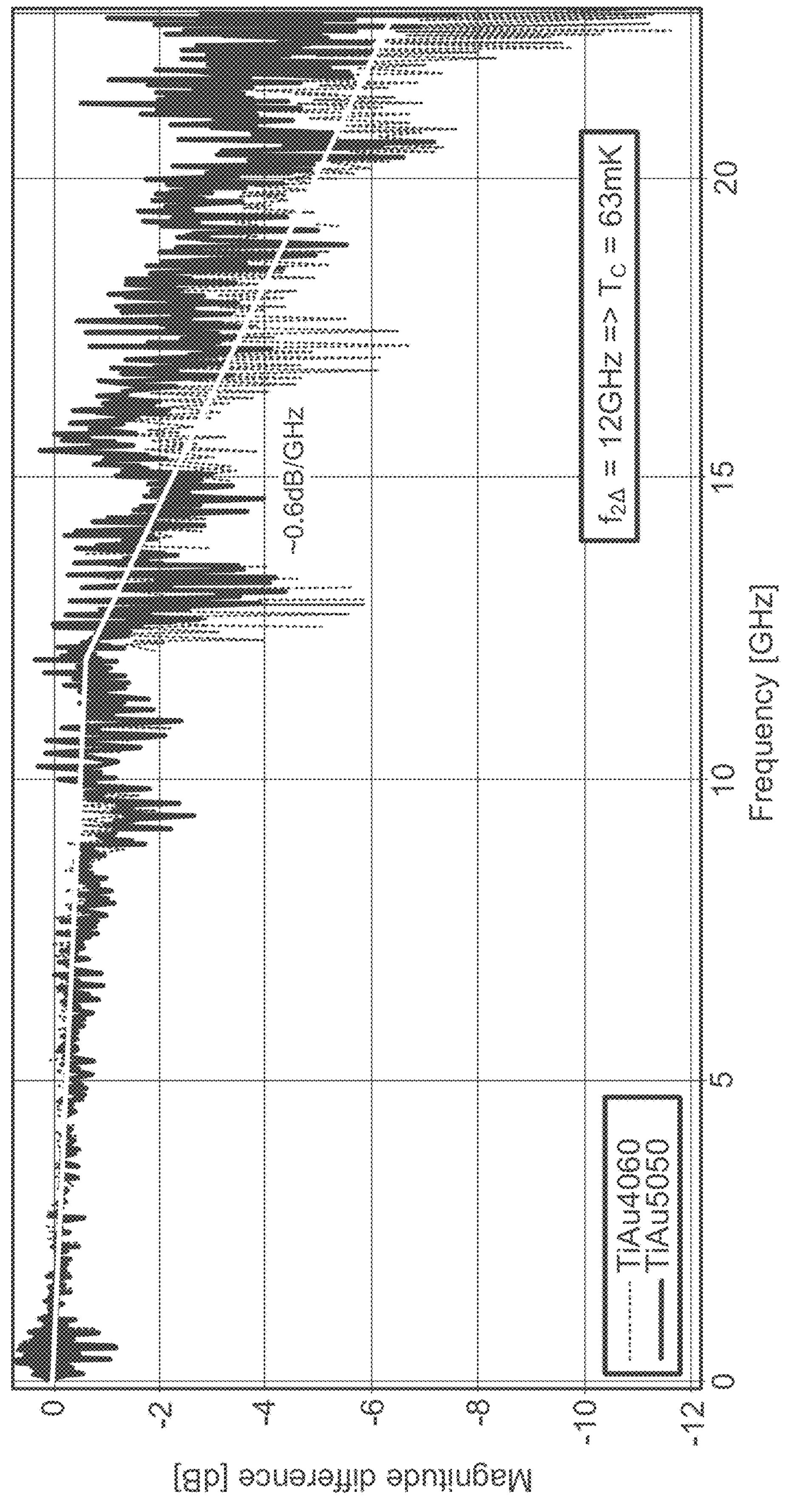
FIG. 12 is a diagram illustrating filtering.

FIG. 12 illustrates experimental data of multilayer stack transmission. The x-axis represents the frequency of a photon or signal component traveling through the stack and the y-axis represents transmission by the stack. The multilayer stacks are bilayer Ti/Au multilayer stacks having two stack configurations: 40 nm Ti/60 nm Au and 50 nm Ti/50 nm Au, where Ti is the first-type layer and Au is the second-type layer. The multilayer stacks have similar 2×superconducting gap frequencies of 12 GHz, corresponding to a critical temperature $T_C$ of 163 mK. Accordingly, the multilayer stacks form low-pass filters with a cutoff frequency of 12 GHz. Below the cutoff frequency, attenuation is very low or zero—the multilayer stacks behave as superconductors. Above the cutoff frequency, the multilayer stacks behave as dissipative metals, and photons/signal components are attenuated with a slope of −0.6 dB/GHz. The slope of the attenuation above the cutoff frequency can be configured by selection at least of materials of the multilayer stacks, relative thicknesses of layers of the multilayer stacks, and the geometry (e.g., length and cross-sectional area) of the multilayer stacks.

Figure 13:
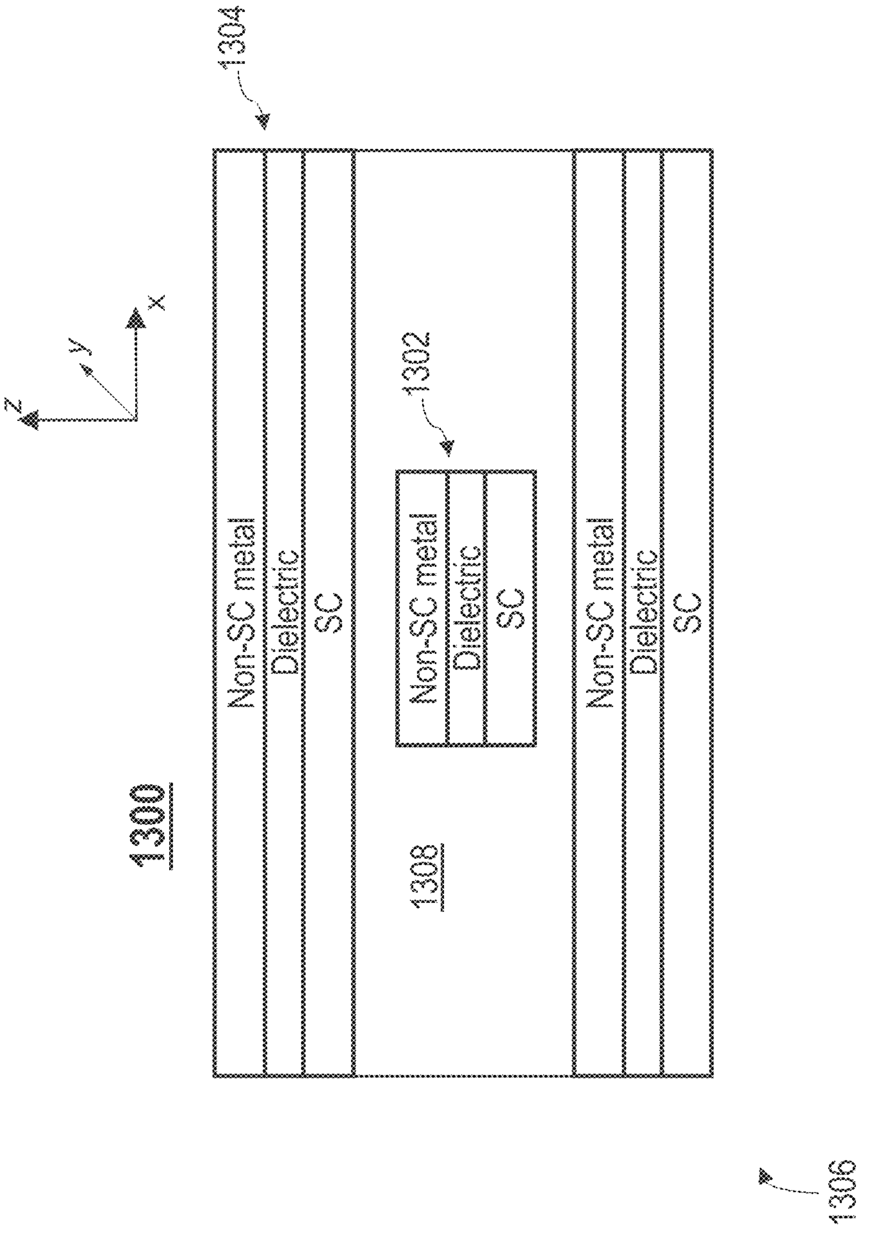
FIG. 13 is a cross-sectional diagram illustrating an example of a filter.

In some implementations, a multilayer stack includes a superconductor layer, a non-superconductor metal layer, and a dielectric layer (e.g., an oxide and/or nitride layer) between the SC and non-SC metal layers. For example, as shown in FIG. 13, a filter 1300 has a stripline configuration in which a center multilayer stack 1302 is sandwiched between multilayer stacks 1304, 1306 acting as ground planes. As noted above, the ground planes can instead be superconductor-only layers.

The multilayer stacks 1302, 1304, 1306 each include an SC layer and a non-SC metal layer with a dielectric layer in-between. The dielectric layer can be, for example, an oxide (e.g., silicon oxide), a nitride (e.g., silicon nitride), and/or an oxynitride. In some implementations, the dielectric layer has a thicknesses sufficient to effectively prevent proximitization between the SC layer and the non-SC metal layer. Accordingly, the multilayer stacks 1302, 1304, 1306 can each behave as a superconducting layer in parallel with a metal layer, in which higher-frequency components (e.g., components with a frequency above twice the superconducting gap frequency of the SC layer) flow through the non-SC metal layer and are attenuated, while lower-frequency components (e.g., components with a frequency below twice the superconducting gap frequency of the SC layer) flow through the SC layer with little or no attenuation. Accordingly, the filter 1300 acts as a low-pass filter with a cutoff frequency equal to twice the superconducting gap frequency of the SC layer.

Although shown in the context of a stripline configuration, a multilayer stack including a SC layer, a dielectric layer, and a non-SC metal layer can be used as the center line/stack and/or return-track/ground plane in other geometries, such as coplanar waveguide and stripline geometries. Moreover, in some implementations the illustrated non-SC metal layer can instead be an SC layer (second-type layer) with a superconducting critical temperature lower than that of the illustrated SC layer (first-type layer).

The filters described herein can advantageously be integrated into various contexts such as packaging, cabling, and on-chip. On-chip integration can offer advantages such as improved spatial utilization and more extensive filtering, e.g., because filtering can be performed in interconnects between components in/on a chip as opposed to, for example, being limited to an input to the chip. Some other filter designs, such as powder-based microwave filters, may not be able to be integrated on-chip with other components such as integrated amplifiers, qubits, qubit readout resonators, qubit control pads, and/or digital logic elements.

Unless indicated otherwise, values provided herein (e.g., for superconducting critical temperature and superconducting gap frequency) refer to ambient-pressure values. In addition, unless indicated otherwise, values provided herein for superconducting critical temperature, superconducting gap frequency, and superconducting critical current are zero-temperature, zero-applied electric field, and zero-applied magnetic field values.

Except where indicated otherwise, in some implementations, the orders/positioning of layers in multilayer stacks can differ from the examples provided. For example, although the filter 600 is illustrated as having an arrangement of (second-type layer/SC/dielectric/SC/second-type layer), other arrangements of the layers are also within the scope of this disclosure, such as second-type layer/SC/dielectric/second-type layer/SC, SC/second-type layer/dielectric/SC/second-type layer, and SC/second-type layer/dielectric/second-type layer/SC. Analogous rearrangements of layers can be applied to, for example, filters 400, 500, 720, 1300, and other filters described herein.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A microwave filter comprising a multilayer stack, the multilayer stack comprising:

one or more first-type layers composed of a first superconductor material having a first superconducting critical temperature; and one or more second-type layers composed of a non-superconductor metal or a second superconductor material having a second superconducting critical temperature that is lower than the first superconducting critical temperature, wherein the multilayer stack is configured to behave as a dissipative metal for photons having a frequency above twice a superconducting gap frequency of the multilayer stack and to behave as a superconductor for photons having a frequency below twice the superconducting gap frequency of the multilayer stack.

2. The microwave filter of claim 1, wherein the multilayer stack is configured to behave as a low-pass filter in which twice the superconducting gap frequency is a cutoff frequency.

3. The microwave filter of claim 1, wherein a composition of the multilayer stack along a stack direction alternates between the one or more first-type layers and the one or more second-type layers.

4. The microwave filter of claim 1, wherein the microwave filter is a microstrip line, a stripline, or a coplanar waveguide.

5. The microwave filter of claim 1, wherein the multilayer stack is arranged in a shape such that the microwave filter behaves as a notch filter that attenuates photons having a frequency within a predefined frequency range.

6. The microwave filter of claim 5, wherein the shape comprises at least one of a spurline geometry or a stub geometry.

7. The microwave filter of claim 5, wherein the predefined frequency range overlaps a frequency range of 8 GHz to 10 GHz.

8. The microwave filter of claim 1, wherein the microwave filter is a cable.

9. The microwave filter of claim 1, comprising a dielectric layer in which the multilayer stack is embedded.

10. The microwave filter of claim 9, wherein the multilayer stack is a first multilayer stack, and wherein the microwave filter comprises:

a second multilayer stack on a first side of the dielectric layer; and a third multilayer stack on a second side of the dielectric layer, wherein each of the second and third multilayer stacks comprises one or more first-type layers and one or more second-type layers.

11. The microwave filter of claim 9, wherein the dielectric layer comprises a polyimide.

12. The microwave filter of claim 1, wherein the multilayer stack is a first multilayer stack, and wherein the microwave filter comprises:

a dielectric layer; and a second multilayer stack comprising one or more first-type layers and one or more second-type layers, wherein the first multilayer stack is on a first side of the dielectric layer, and wherein the second multilayer stack is on a second side of the dielectric layer.

13. The microwave filter of claim 1, wherein the multilayer stack is a first multilayer stack, and wherein the microwave filter comprises:

a substrate on which the first multilayer stack is disposed;

a second multilayer stack disposed on the substrate, the second multilayer stack extending adjacent to a first side of the first multilayer stack; and a third multilayer stack disposed on the substrate, the third multilayer stack extending adjacent to a second side of the first multilayer stack, wherein each of the second and third multilayer stacks comprises one or more first-type layers and one or more second-type layers.

14. The microwave filter of claim 13, wherein the first, second, and third multilayer stacks are disposed on a first surface of the substrate, and wherein the microwave filter comprises:

a fourth multilayer stack disposed on a second surface of the substrate opposite the first surface, wherein the fourth multilayer stack comprises one or more first-type layers and one or more second-type layers.

15. The microwave filter of claim 1, comprising a printed circuit board, wherein the multilayer stack is a trace on the printed circuit board.

16. The microwave filter of claim 1, wherein the multilayer stack comprises a third-type layer composed of a third superconductor material having a superconducting critical current density that is larger than a superconducting critical current density of the first superconductor material.

17. The microwave filter of claim 16, wherein the one or more first-type layers are arranged in a skin depth region of the microwave filter, and wherein the third-type layer is arranged outside the skin depth region.

18. The microwave filter of claim 16, wherein the multilayer stack comprises, on each of two opposite sides of the third-type layer, a sub-stack comprising at least one of the one or more first-type layers and at least one of the one or more second-type layers.

19. The microwave filter of claim 16, wherein a thickness of the third-type layer is greater than thicknesses of the one or more first-type layers.

20. The microwave filter of claim 1, wherein a first first-type layer of the one or more first-type layers has a first footprint area that is orthogonal to a stack direction, and wherein a first second-type layer of the one or more second-type layers has a second footprint area that is orthogonal to the stack direction, wherein the first footprint area is different from the second footprint area.

21. The microwave filter of claim 20, wherein a portion of the second footprint area protrudes beyond the first footprint area.

22. The microwave filter of claim 1, wherein twice the superconducting gap frequency of the multilayer stack is between 8 GHz and 50 GHz.

23. The microwave filter of claim 1, wherein a superconducting critical temperature of the multilayer stack is between 110 mK and 680 mK.

24. The microwave filter of claim 1, wherein the multilayer stack is configured to exhibit, for signal components having a frequency above twice the superconducting gap frequency of the multilayer stack, a sheet resistance between 0.1 Ω/square and 10 Ω/square for at least some temperatures between 8 mK and 200 mK.

25. The microwave filter of claim 1, wherein a superconductor critical current of the multilayer stack is between 0.1 mA and 25 mA.

26. The microwave filter of claim 1, wherein the one or more first-type layers and the one or more second-type layers each have a thickness between 10 nm and 100 nm.

27. The microwave filter of claim 1, wherein the microwave filter is coupled to a quantum computing device, wherein the quantum computing device comprises a quantum processor, a qubit readout resonator, or a qubit.

28. The microwave filter of claim 27, wherein the microwave filter is configured to filter out the photons having the frequency above twice the superconducting gap frequency of the multilayer stack from a signal that couples to the quantum computing device.

29. The microwave filter of claim 1, wherein the multilayer stack comprises a dielectric layer between a first first-type layer of the one or more first-type layers and a first second-type layer of the one or more second-type layers.

* * * * *